United States Patent
Bono et al.

(10) Patent No.: US 9,753,943 B1
(45) Date of Patent: Sep. 5, 2017

(54) TECHNIQUES FOR DISTRIBUTING ACCESS TO FILESYSTEMS THROUGH MULTIPE FILESYSTEM MANAGEMENT NODES

(71) Applicant: EMC Corporation, Hopkinton, MA (US)

(72) Inventors: Jean-Pierre Bono, Westborough, MA (US); Frederic Corniquet, Le Pecq (FR); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 296 days.

(21) Appl. No.: 14/674,732

(22) Filed: Mar. 31, 2015

(51) Int. Cl.
*G06F 17/30* (2006.01)
*H04L 29/08* (2006.01)

(52) U.S. Cl.
CPC .. *G06F 17/30203* (2013.01); *G06F 17/30233* (2013.01); *H04L 67/1097* (2013.01)

(58) Field of Classification Search
CPC ........... G06F 17/30067; G06F 17/3007; G06F 17/30091; G06F 17/30194; G06F 17/302; G06F 17/30203; G06F 17/30233; G06F 17/30235; H04L 67/1097
USPC .................................. 707/821, 822, 827
See application file for complete search history.

(56) References Cited

U.S. PATENT DOCUMENTS

| | | |
|---|---|---|
| 5,948,062 A | 9/1999 | Tzelnic et al. |
| 6,192,408 B1 | 2/2001 | Vahalia et al. |
| 6,625,750 B1 | 9/2003 | Duso et al. |
| 7,437,407 B2 | 10/2008 | Vahalia et al. |
| 7,937,453 B1 * | 5/2011 | Hayden ............. G06F 17/30203 707/607 |
| 8,595,237 B1 * | 11/2013 | Chaudhary ....... G06F 17/30619 707/741 |
| 9,305,009 B1 | 4/2016 | Bono et al. |
| 9,330,103 B1 | 5/2016 | Bono et al. |
| 9,354,976 B2 * | 5/2016 | Amlekar ............. G06F 11/1402 |

(Continued)

OTHER PUBLICATIONS

Jean-Pierre Bono, et al.; "Unified Datapath Processing With Virtualized Storage Processors"; U.S. Appl. No. 13/828,294, filed Mar. 14, 2013.

(Continued)

*Primary Examiner* — Hares Jami
(74) *Attorney, Agent, or Firm* — BainwoodHuang

(57) ABSTRACT

A data storage system has one or more processing nodes, each processing node comprising memory coupled to processing circuitry, the one or more processing nodes running a set of virtualized filesystem managers (VFMs) having a shared namespace. The set of VFMs includes (a) a master VFM for managing a configuration filesystem stored on the persistent storage, the configuration filesystem storing configuration information for the set of VFMs and (b) a slave VFM for remotely mounting the configuration filesystem from the master VFM, the slave VFM obtaining details of its configuration from the remotely-mounted configuration filesystem, the slave VFM sharing the shared namespace with the set of VFMs, the shared namespace including a set of filesystems, each filesystem of the shared namespace being managed by a single VFM, and each filesystem of the shared namespace being accessible by the remote host through any of the VFMs of the set of VFMs.

16 Claims, 6 Drawing Sheets

(56) References Cited

U.S. PATENT DOCUMENTS

| | | | |
|---|---|---|---|
| 9,378,219 B1 | 6/2016 | Bono et al. | |
| 9,552,363 B2* | 1/2017 | Novak | G06F 17/30174 |
| 2002/0144047 A1* | 10/2002 | Loy | G06F 9/542 |
| | | | 711/1 |
| 2005/0114350 A1* | 5/2005 | Rose | G06F 3/0613 |
| 2005/0235005 A1* | 10/2005 | Aono | G06F 17/30233 |
| 2006/0184540 A1* | 8/2006 | Kung | G06F 17/3089 |
| 2006/0259949 A1* | 11/2006 | Schaefer | G06F 17/30082 |
| | | | 726/1 |
| 2009/0259798 A1* | 10/2009 | Wang | G06F 3/0607 |
| | | | 711/103 |
| 2016/0224580 A1* | 8/2016 | Jain | G06F 17/30194 |

OTHER PUBLICATIONS

Brendon Higgins; "NetApp C-mode for 7 mode engineers"; LinkedIn SlideShare; Nov. 12, 2012; <http://www.slideshare.net/subtitle/netapp-cmode-for-7-mode-engineers> accessed Jan. 4, 2017, 5 pages.

* cited by examiner

(12) United States Patent
US 9,753,943 B1

TECHNIQUES FOR DISTRIBUTING ACCESS TO FILESYSTEMS THROUGH MULTIPE FILESYSTEM MANAGEMENT NODES

BACKGROUND

Data storage systems are often used to store large quantities of data with fast access times. Filesystem management devices are often used to manage filesystems for data storage systems. As data storage systems increase in capacity, more processing power is needed to manage the increased number of filesystems.

Some systems scale up by increasing the processing power of a filesystem management device. Other systems scale out by adding more filesystem management devices to manage different filesystems, which allows for more scalability.

SUMMARY

Unfortunately, the above-described conventional systems suffer from deficiencies. As more filesystem management devices are added to a system, it can become burdensome on hosts accessing the data storage system to communicate with the appropriate filesystem management device responsible for managing each filesystem. Some systems use virtualized filesystem managers, creating an even larger number of nodes responsible for managing the various filesystems, which further increases the complexity of hosts dealing with the appropriate filesystem manager.

Thus, it would be desirable to provide a data storage system with a plurality of flexible virtual filesystem managers that are capable of responding to hosts without requiring the hosts to maintain records about which filesystems are managed by which virtual filesystem managers. This can be done by arranging the virtual filesystem managers in a master/slave configuration having one master and several slaves, the master providing configuration information for the slaves and creating a shared namespace between the virtual filesystem managers. Hosts are then able to access any filesystem within the shared namespace through any of the virtual filesystem managers, even if the filesystem is managed by a different virtual filesystem manager.

One embodiment of the improved techniques is directed to a system having (1) persistent storage, (2) networking circuitry for connecting to a remote host over a network, and (3) one or more processing nodes, each processing node comprising memory coupled to processing circuitry, the one or more processing nodes running a set of virtualized filesystem managers (VFMs) having a shared namespace. The set of VFMs includes (a) a master VFM, the master VFM managing a configuration filesystem stored on the persistent storage, the configuration filesystem storing configuration information for the set of VFMs and (b) a slave VFM, the slave VFM remotely mounting the configuration filesystem from the master VFM, the slave VFM obtaining details of its configuration from the remotely-mounted configuration filesystem, the slave VFM sharing the shared namespace with the set of VFMs, the shared namespace including a set of filesystems stored on the persistent storage, each filesystem of the shared namespace being managed by a single VFM of the set of VFMs, and each filesystem of the shared namespace being accessible by the remote host through any of the VFMs of the set of VFMs.

One embodiment is directed to a method performed by a slave VFM running on processing circuitry of a data storage system. The method includes (A) remotely mounting a configuration filesystem stored on persistent storage of the data storage system from a master VFM running on the processing circuitry of the data storage system, the master VFM managing the remotely-mounted configuration filesystem, the remotely-mounted configuration filesystem storing configuration information for the set of VFMs, the slave VFM obtaining details of its configuration from the remotely-mounted configuration filesystem, (B) remotely mounting a remote filesystem stored on persistent storage of the data storage system from a manager VFM of a set of VFMs running on the processing circuitry, the set of VFMs having a shared namespace, the manager VFM managing the remote filesystem, the remote filesystem being within the shared namespace, and (C) processing a first filesystem storage command directed at the remote filesystem received from a remote host over a network interface of the data storage system by sending a second filesystem storage command directed at the remote filesystem of the shared namespace from the slave VFM to the manager VFM and receiving a storage fulfillment reply at the slave VFM from the manager VFM in response.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for providing a data storage system with a plurality of flexible virtual filesystem managers that are capable of responding to hosts without requiring the hosts to maintain records about which filesystems are managed by which virtual filesystem managers. This can be done by arranging the virtual filesystem managers in a master/slave configuration having one master and several slaves, the master providing configuration information for the slaves and creating a shared namespace between the virtual filesystem managers. Hosts are then able to access any filesystem within the shared namespace through any of the virtual filesystem managers, even if the filesystem is managed by a different virtual filesystem manager.

Figure 1:
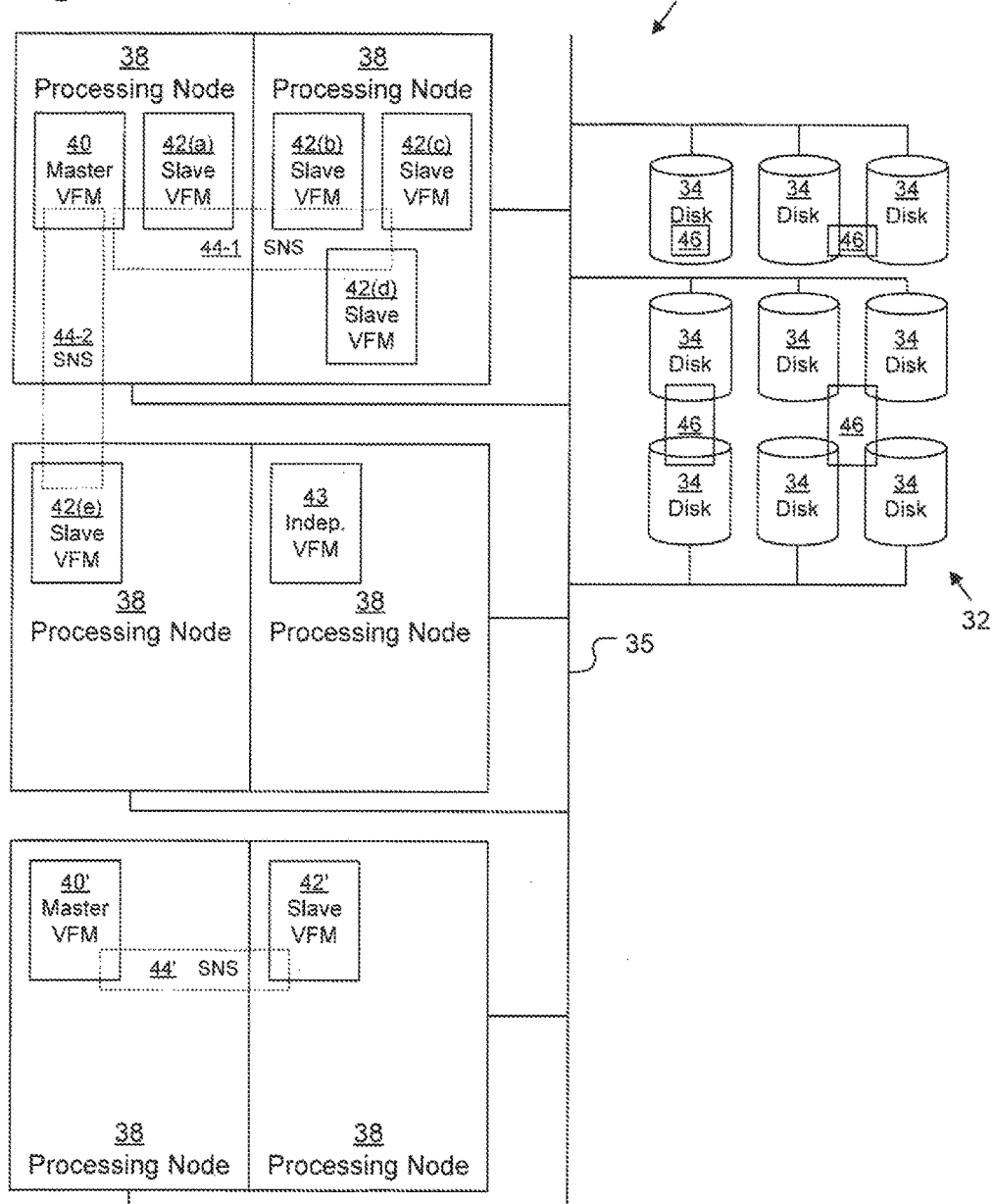
FIG. 1 is a block diagram depicting a logical view of an example system according to various embodiments.

FIG. 1 depicts a data storage system (DSS) 30. DSS 30 may be, for example, a VMAX® series enterprise data storage system provided by the EMC Corporation of Hopkinton, Mass. DSS 30 is typically housed in one or more storage cabinets (not depicted). DSS 30 includes a set 32 of disks 34 connected, via a storage interconnect 35, to a set of processing nodes 38. Disks 34 may be any kind of persistent storage drives, such as, for example, magnetic hard disk drives and flash-based solid state disk drives. There may be any number of disks 32 in DSS 30. In an example system, there may be between forty-eight and 3,200 disks 34. Interconnect 35 may be any kind of storage interconnect, but it is typically based on high speed Fibre Channel.

There may be any number of processing nodes 38, although in some systems a minimum of two and maximum of eight are used. Processing nodes 38 may run one or more applications. Typically processing nodes 38 run a block-based storage I/O stack (not depicted). At least one processing node 38 runs at least one virtualized filesystem managers (VFMs) 40, 42, such as, for example, a Virtual Data Mover (VDM) produced by the EMC Corporation. DSS 30 runs one master VFM 40 and one or more slave VFMs 42, depicted as slave VFMS 42(a), 42(b), 42(c), 42(d), 42(e), although, in some embodiments, an additional one or more master VFMs 40' may operate independently in conjunction with its own slave VFMs 42'. In some embodiments, there may be one or more independent VFMs 43, which are neither slaves nor masters.

Master VFM 40 is configured to manage one or more shared namespaces (SNSes) 44 (depicted as SNSes 44-1, 44-2). An SNS 44 is a namespace shared by a group of VFMs 40, 42. As depicted in FIG. 1, SNS 44-1 encompasses master VFM 40 and slave VFMs 42(a), 42(b), 42(c), and 42(d), while SNS 44-2 encompasses master VFM 40 and slave VFM 42(e). Master VFM 40 provides common configuration information to the various members of an SNS 44.

Each SNS 44 includes a common set of filesystems 46 that reside on disks 34. Each filesystem 46 within an SNS 44 is managed by one VFM 40, 42 of that SNS 44, but is accessible via any of the VFMs 40, 42 within that SNS 44.

Figure 2:
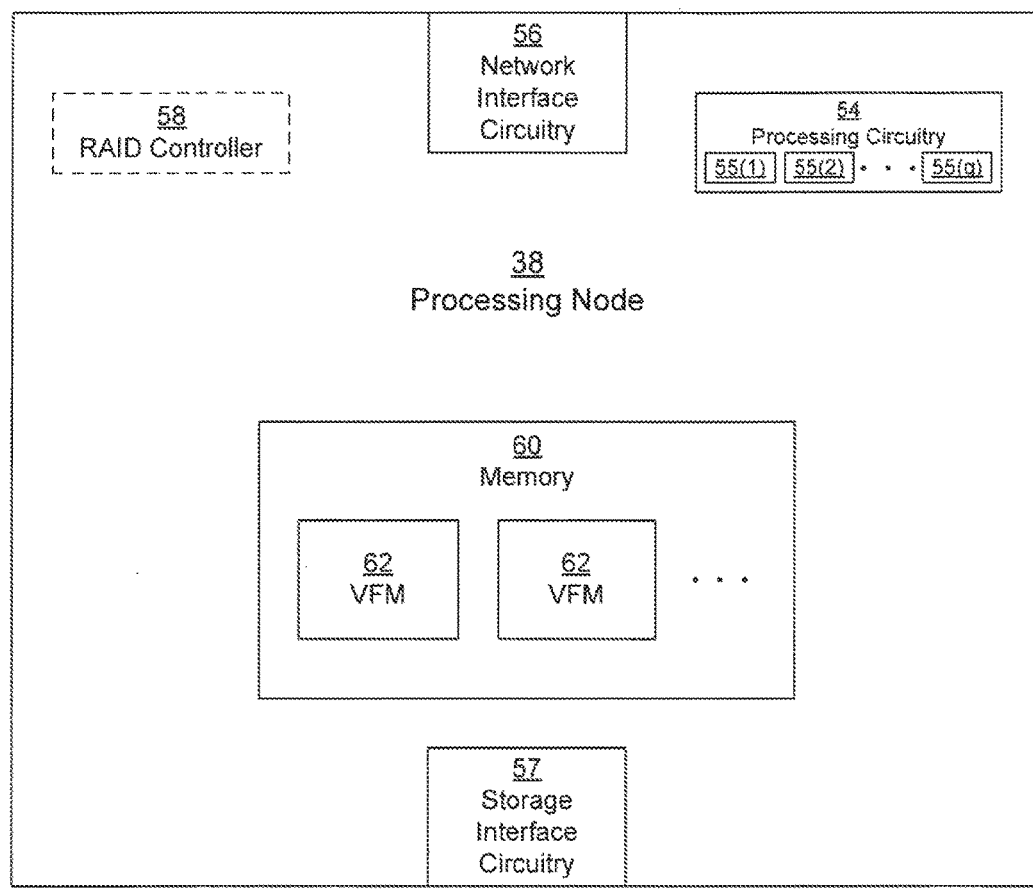
FIG. 2 is a block diagram depicting an example hardware component according to various embodiments.

FIG. 2 depicts an example processing node 38 in further detail. Processing node 38 includes network interface circuitry 56, processing circuitry 54, storage interface circuitry 57, and memory 60. In some embodiments, processing node 38 also includes a hardware-based RAID controller 58. The elements 54, 56, 57, 58, 60 may be interconnected by a high-speed local bus, such as a PCIe interconnect.

Network interface circuitry 56 may include one or more Ethernet cards, cellular modems, Fibre Channel adapters, Wireless Fidelity (WiFi) wireless networking adapters, any other devices for connecting to a network (e.g., a storage area network, a local area network, a wide area network, etc.), or some combination thereof.

Processing circuitry 54 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processing circuitry 54 may also include circuitry configured to control the disks 34, although in some embodiments this functionality is included within RAID controller 58. As depicted, processing circuitry 54 includes multiple processing cores 55 (depicted as cores 55(1), 55(2), . . . , 55(q)), each of which is able to perform a different thread of execution simultaneously. In an example embodiment processing circuitry may include four six-core Intel® Xeon® processors.

Storage interface circuitry 57 may include one or more SCSI adapters, Fibre Channel adapters, any other devices configured to connect to storage interconnect 35, or some combination thereof.

Memory 60 may be any kind of digital system memory, such as, for example, random access memory (RAM). Memory 60 stores an operating system in operation (not depicted, e.g., Linux, UNIX, Windows, or a similar operating system), various storage system management programs in operation (not depicted), and one or more applications executing on processing circuitry 54 as well as data used by those applications. Memory 60 also stores a storage stack, which is configured to process data storage operations directed at the disks 34 of the DSS 30. In some embodiments memory 60 may include, for example, 256 gigabytes of memory.

In some embodiments, the storage stack includes a software RAID controller, although, in other embodiments, this functionality is instead performed by hardware RAID controller 58 or by specialized circuitry of processing circuitry 54.

Memory 60 may also store one or more VFM2 62 (e.g., a master VFM 40, slave VFMs 42, or independent VFMs 43.

Figure 3:
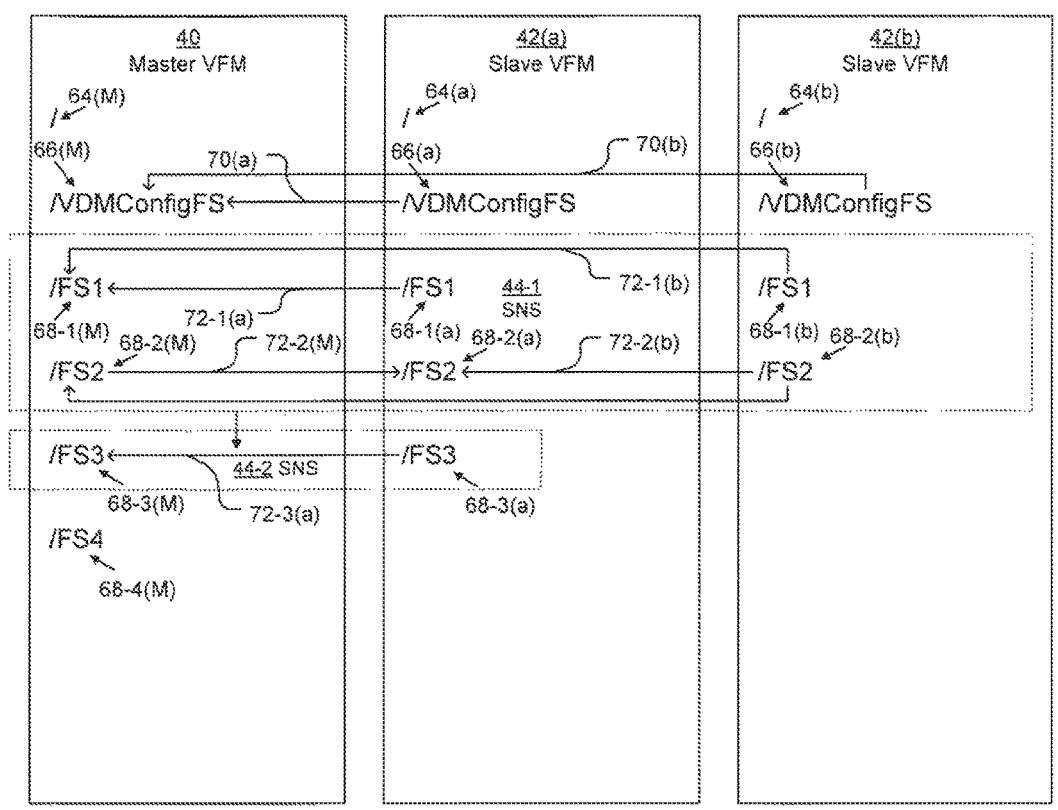
FIG. 3 is a block diagram depicting an example arrangement of filesystems across several VFMs.

FIG. 3 depicts example memory layouts of a master VFM 40 and various slave VFMs 42(a), 42(b). Master VFM 40 shares SNS 44-1 with both slave VFMs 42(a), 42(b). Master VFM 40 also shares SNS 44-2 with only slave VFM 42(a).

Figure 4:
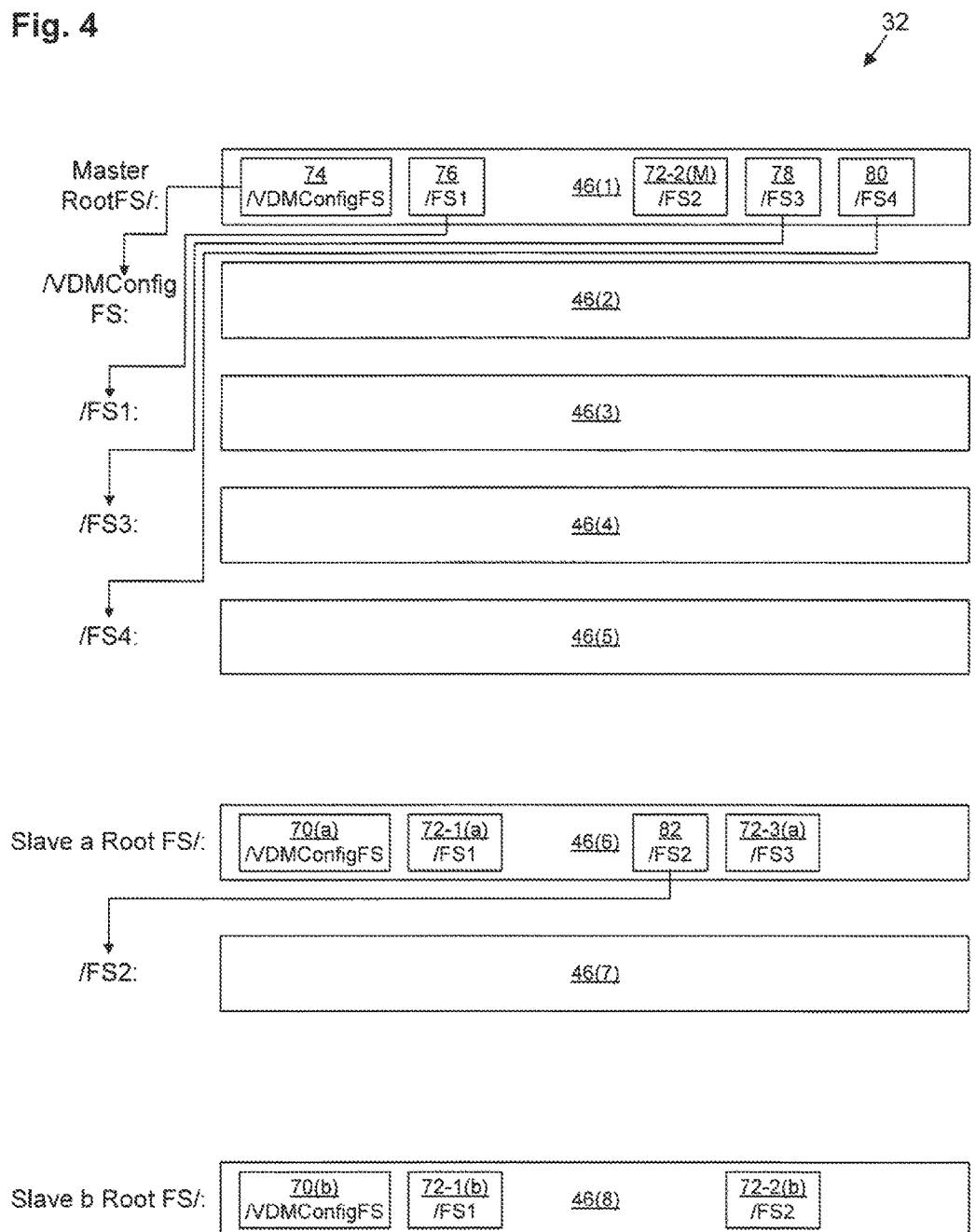
FIG. 4 is a block diagram depicting example data layouts on example filesystems according to various embodiments.

Master VFM 40 includes a root (/) directory 64(M) defined by a root filesystem 46(1) (see FIG. 4). Master VFM 40 also includes various filesystem mountpoints 66(M), 68-1(M), 68-2(M), 68-3(M), 68-4(M) that are defined by various filesystems 46(2) (/VDMConfigFS), 46(3) (/FS1), 46(7) (/FS2), 46(4) (/FS3), and 46(5) (/FS4), respectively mounted under root. This arrangement is by way of example only; there may be any number of filesystems 46 mounted under root in the master VFM 40.

Master VFM 40 manages the local /VDMConfigFS filesystem 46(2). This /VDMConfigFS filesystem 46(2) stores various configuration information for master VFM 40 and its slave VFMs 42.

Master VFM 40 also manages various other local filesystems 46(3) (/FS1), 46(4) (/FS3), and 46(5) (/FS4) mounted under root. Thus, the master root filesystem 46(1) includes pointers 74, 76, 78, 80 to locally-mounted filesystems 46(2) (/VDMConfigFS), 46(3) (/FS1), 46(4) (/FS3), and 46(5) (/FS4), respectively.

Master VFM 40 defines (within configuration information stored in the /VDMConfigFS filesystem 46(2)) its SNSes 44-1, 44-2. Although two SNSes 44-1, 44-2 are depicted, master VFM 40 may define any number of SNSes 44. Master VFM 40 may also include one or more locally-mounted filesystems 46 that are not part of any SNS 44. As depicted in FIG. 3, SNS 44-1 includes filesystems 46(3) (/FS1) and 46(7) (/FS2), while SNS 44-2 includes filesystem 46(4) (/FS3). Filesystem 46(5) (/FS4) is entirely local, not being found within any SNS 44.

Master VFM 40 may also include one or more remotely-mounted filesystems 46 mounted on a slave VFM 42. Thus, as depicted, master VFM 40 remotely mounts filesystem 46(7) (/FS2) from slave VFM 42(a) by including a pointer 72-2(M) to mountpoint 68-1(a) on slave VFM 42(a) within its root filesystem 46(1).

Slave VFMs 42(a), 42(b) each include their own respective root (/) directories 64(a), 64(b) defined, respectively by root filesystems 46(6) and 46(8).

Slave VFM 42(a) also includes various filesystem mountpoints 66(a), 68-1(a), 68-2(a), 68-3(a), that are defined by various filesystems 46(2) (/VDMConfigFS), 46(3) (/FS1), 46(7) (/FS2), and 46(4) (/FS3) respectively mounted under root. This arrangement is by way of example only; there may be any number of filesystems 46 mounted under root in a slave VFM 42 as defined by the SNSes 44 of which it is a member.

Slave VFM 42(a) remotely mounts the /VDMConfigFS filesystem 46(2) from master VFM 40, from which it obtains its configuration information provided by master VFM 40. Slave VFM 42(*a*) remotely mounts the /VDMConfigFS filesystem 46(2) from master VFM 40 by including a pointer 70(*a*) to mountpoint 66(M) on master VFM 40 within its root filesystem 46(6).

Slave VFM 42(*a*) also manages its own local filesystem 46(7) (/FS2) mounted under root at mountpoint 68-2(*a*). Thus, its root filesystem 46(6) includes a pointer 82 to locally-mounted filesystems 46(7) (/FS2). Slave VFM 42(*a*) exports this mountpoint 68-2(*a*) to all other VFMs 62 within the SNS 44-1 (i.e., master VFM 40 and slave VFM 42(*b*)). Slave VFM 42(*a*) also remotely mounts filesystems 46(3) (/FS1) and 46(4) (/FS3) from master VFM 40 by including pointer 72-1(*a*) to mountpoint 68-1(M) and pointer 72-3(*a*) to mountpoint 68-3(M), respectively, within its root filesystem 46(6).

Slave VFM 42(*b*) also includes various filesystem mountpoints 66(*b*), 68-1(*b*), 68-2(*b*), that are defined by various filesystems 46(2) (/VDMConfigFS), 46(3) (/FS1), and 46(7) (/FS2) respectively mounted under root. Slave VFM 42(*b*) remotely mounts the /VDMConfigFS filesystem 46(2) from master VFM 40, from which it obtains its configuration information provided by master VFM 40. Slave VFM 42(*b*) remotely mounts the/VDMConfigFS filesystem 46(2) from master VFM 40 by including a pointer 70(*b*) to mountpoint 66(M) on master VFM 40 within its root filesystem 46(8). As depicted, slave VFM 42(*b*) does not manage any of its own local filesystems 46. Slave VFM 42(*b*) also remotely mounts filesystem 46(3) (/FS1) from master VFM 40 by including pointer 72-1(*b*) to mountpoint 68-1(M) within its root filesystem 46(8). Slave VFM 42(*b*) also remotely mounts filesystem 46(7) (/FS2) from slave VFM 42(*a*) by including pointer 72-2(*b*) to mountpoint 68-2(*a*) within its root filesystem 46(8).

FIG. 4, which has already been described in the context of FIG. 3, shows example layouts of filesystems 46 that are stored on the set 32 of disks 34 of DSS 30. These filesystems 46 may be stored in various ways, including on one disk 34 or on a RAID group encompassing several of the disks 34.

Figure 5:
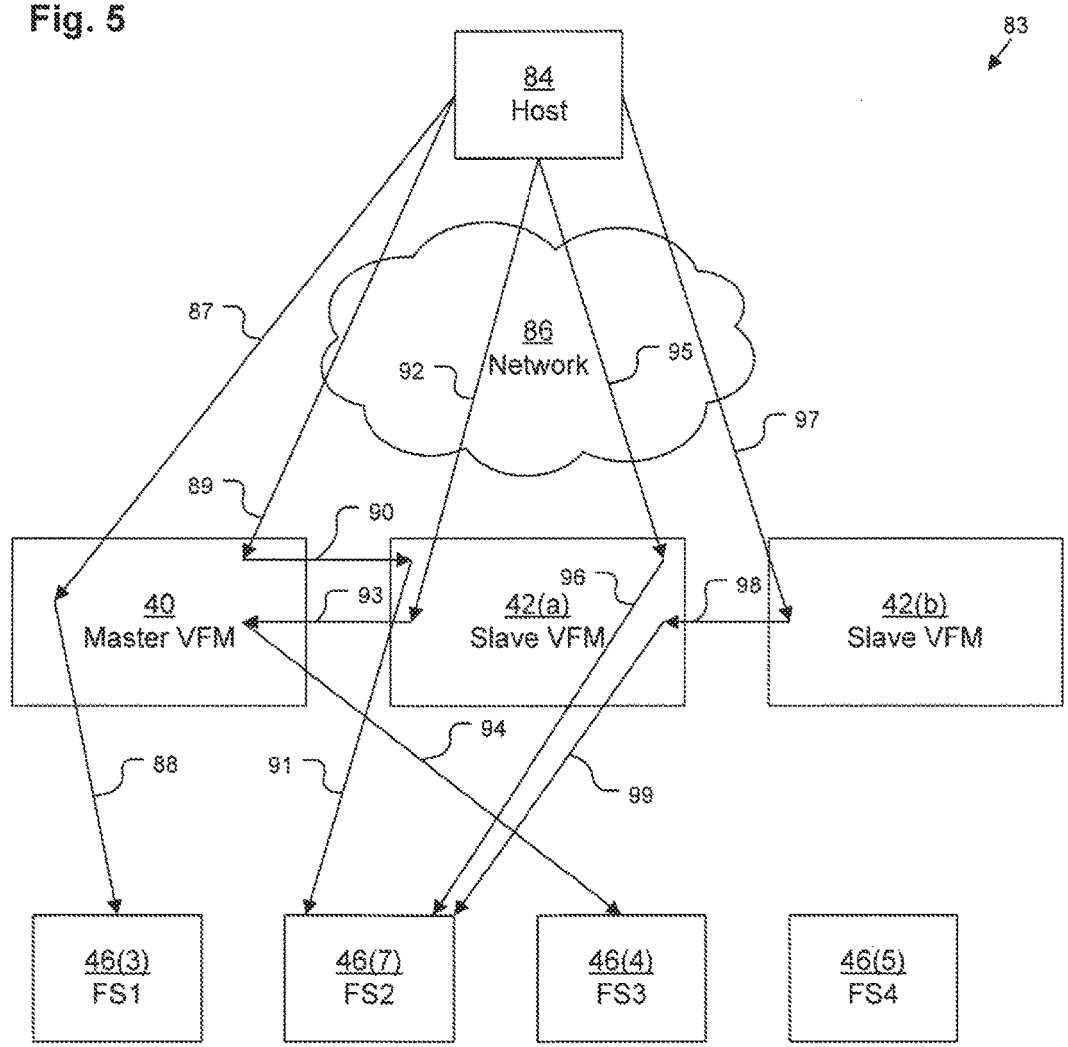
FIG. 5 is a block/sequence diagram depicting a how filesystem access is accomplished in an example embodiment.

FIG. 5 depicts several examples of the operation of DSS 30 in the larger context of a system 83. System 83 includes one or more hosts 84 connected to one or more of the processing nodes 38 of DSS 30 over network 86. Network 86 may be any kind of network, such as, for example, a local area network, a wide area network, the Internet, a storage area network, a fabric of interconnected hubs and switches, etc. In some embodiments, in lieu of a network, direct point-to-point connections may be used. Host 84 is able to access any of the filesystems 46(3) (/FS1) and 46(7) (/FS2) within SNS 44-1 by communicating with any VFM 62 within SNS 44-1 (i.e., master VFM 40, slave VFM 42(*a*), or slave VFM 42(*b*)). Host 84 is also able to access any filesystem 46(4) (/FS3) within SNS 44-2 by communicating with any VFM 62 within SNS 44-2 (i.e., master VFM 40 or slave VFM 42(*a*)). Thus, operation of host 84 is simplified by being able to access multiple filesystems 46 via a flexible set of VFMs 62.

In operation, host 84 may send a data storage command 87 to master VFM 40 seeking access to filesystem 46(3) (/FS1). Master VFM 40 is able to fulfill this command by directly accessing filesystem 46(3) (/FS1), which it manages itself, by resolving the data storage command 87 into one or more data storage commands 88 directed at the blocks of storage that underlie filesystem 46(3) (/FS1).

Host 84 may also send a data storage command 89 to master VFM 40 seeking access to filesystem 46(7) (/FS2). Master VFM 40 is able to fulfill this command by sending another data storage command 90 to slave VFM 42(*a*), which is configured to manage filesystem 46(7) (/FS2). Then, slave VFM 42(*a*) is able to fulfill this command by directly accessing filesystem 46(7) (/FS2), which it manages itself, by resolving the data storage command 90 into one or more data storage commands 91 directed at the blocks of storage that underlie filesystem 46(7) (/FS2).

It should be understood that operation such as that described in the context of storage commands 89-91 is particularly advantageous when master VFM 40 and slave VFM 42(*a*) both operate on a single processing node 38. In such cases, the master VFM 40 and slave VFM 42(*a*) share access to cache within memory 60, avoiding the need to transfer any data between the master VFM 40 and slave VFM 42(*a*) across interconnect 35.

Host 84 may also send a data storage command 92 to slave VFM 42(*a*) seeking access to filesystem 46(4) (/FS3). Slave VFM 32(*a*) is able to fulfill this command by sending another data storage command 93 to master VFM 40, which is configured to manage filesystem 46(4) (/FS3). Then, master VFM 40 is able to fulfill this command by directly accessing filesystem 46(4) (/FS3), which it manages itself, by resolving the data storage command 93 into one or more data storage commands 94 directed at the blocks of storage that underlie filesystem 46(4) (/FS3).

Host 84 may also send a data storage command 95 to slave VFM 42(*a*) seeking access to filesystem 46(7) (/FS2). Slave VFM 42(*a*) is able to fulfill this command by directly accessing filesystem 46(7) (/FS2), which it manages itself, by resolving the data storage command 95 into one or more data storage commands 96 directed at the blocks of storage that underlie filesystem 46(7) (/FS2).

Host 84 may also send a data storage command 97 to slave VFM 42(*b*) seeking access to filesystem 46(7) (/FS2). Slave VFM 32(*b*) is able to fulfill this command by sending another data storage command 98 to slave VFM 42(*a*), which is configured to manage filesystem 46(7) (/FS2). Then, slave VFM 42(*a*) is able to fulfill this command by directly accessing filesystem 46(7) (/FS2), which it manages itself, by resolving the data storage command 98 into one or more data storage commands 99 directed at the blocks of storage that underlie filesystem 46(7) (/FS2).

Figure 6:
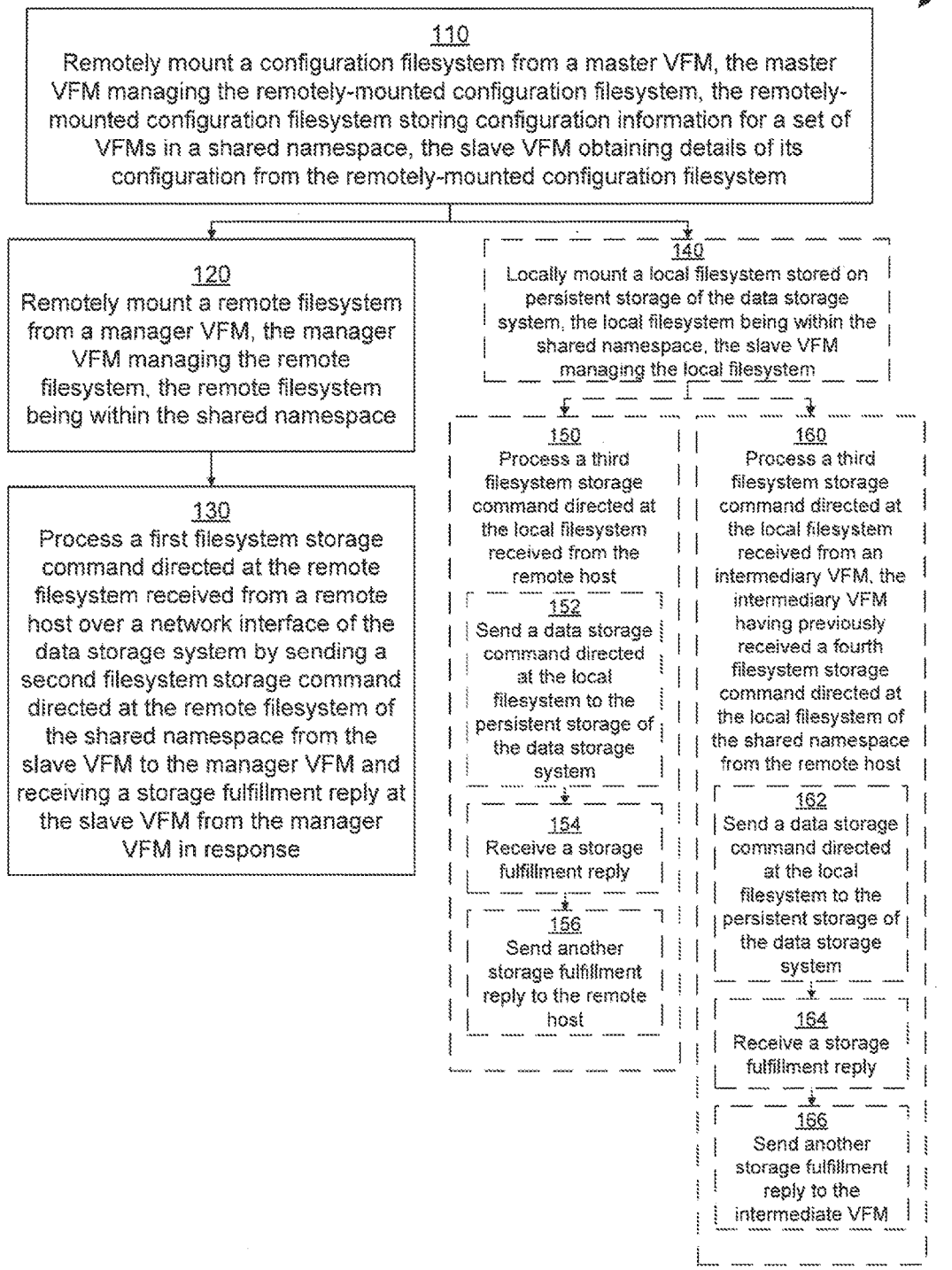
FIG. 6 is a flowchart depicting an example method according to various embodiments.

FIG. 6 illustrates an example method 100 performed by a slave VFM 42 according to various embodiments for providing access to all filesystems 46 within an SNS 44 that it is a member of. It should be understood that any time a piece of software (e.g., master VFM 40 or a slave VFM 42) is described as performing a method, process, step, or function, in actuality what is meant is that a computing device (e.g., processing node 38) on which that piece of software is running performs the method, process, step, or function when executing that piece of software on its processing circuitry 54 and/or RAID controller 58.

It should be understood that, within FIG. 6, steps 140-166 are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order.

In step 110, slave VFM 42 (e.g., slave VFM 42(*a*), 42(*b*)) remotely mounts a configuration filesystem 46(2) (/VDMConfigFS) stored on persistent storage 32 of the DSS 30 from the master VFM 40 running on the processing circuitry of the data storage system (e.g., on a processing node 38 of the DSS 30), the master VFM 40 managing the remotely-mounted configuration filesystem 46(2) (/VDMConfigFS), the remotely-mounted configuration filesystem 46(2) (/VD-MConfigFS) storing configuration information for a set of VFMs 40, 42 having an SNS 44 (e.g., SNS 44-1, 44-2), the slave VFM 42 obtaining details of its configuration from the remotely-mounted configuration filesystem 46(2) (/VDM-ConfigFS).

In step 120, slave VFM 42 remotely mounts a remote filesystem 46 (e.g., 46(3) (/FS1), 46(7) (/FS2), 46(4) (/FS3), etc.) stored on persistent storage 32 of the DSS 30 from a manager VFM (e.g., master VFM 40, slave VFM 42(*a*)) of a set of VFMs 40, 42 running on the processing circuitry, the manager VFM managing the remote filesystem 46, the remote filesystem 46 being within the SNS 44.

Thus, for example, in the case of slave 42(*a*) and SNS 44-1, step 120 may involve remotely mounting filesystem 46(3) (/FS1) managed by master VFM 40, the manager VFM being the master VFM 40. As another example, in the case of slave 42(*a*) and SNS 44-2, step 120 may involve remotely mounting filesystem 46(4) (/FS3) managed by master VFM 40, the manager VFM being the master VFM 40. As another example, in the case of slave 42(*b*) and SNS 44-1, step 120 may involve remotely mounting filesystem 46(3) (/FS1) managed by master VFM 40, the manager VFM being the master VFM 40. As another example, in the case of slave 42(*b*) and SNS 44-1, step 120 may involve remotely mounting filesystem 46(7) (/FS2) managed by slave VFM 42(*a*), the manager VFM being the slave VFM 42(*a*).

In step 130, slave VFM 42 processes a first filesystem storage (e.g., storage command 92 received by slave VFM 42(*a*), storage command 97 received by slave VFM 42(*b*)) command directed at the remotely-mounted filesystem 46 received from a remote host 84 over a network interface (e.g., network interface circuitry 56 of the processing node 38 on which the slave VFM 42 is running) by sending a second filesystem storage command (e.g, storage command 93 sent by slave VFM 42(*a*), storage command 98 sent by slave VFM 42(*b*)) directed at the remotely-mounted filesystem 46 of the shared namespace from the slave VFM to the manager VFM (e.g., master VFM 40, slave VFM 42(*a*)) and receiving a storage fulfillment reply at the slave VFM 42 from the manager VFM in response.

Thus, for example, in the context of storage command 92 directed at filesystem 46(4) (/FS3) received by slave VFM 42(*a*), slave VFM 42(*a*) determines that filesystem 46(4) (/FS3) is in a local namespace 44-2 but is managed remotely by master VFM 40, so it sends storage command 93 to master VFM 40 as the manager VFM for fulfillment. Master VFM 40 then locally fulfills the storage command 93 with respect to filesystem 46(4) (/FS3) by sending storage command 94 directed at the blocks of storage that underlie filesystem 46(4) (/FS3). For example, in the case of a write command, master VFM 40 would cause data of the storage command 93 to be written to an appropriate location within filesystem 46(4) (/FS3) on disk 34. Similarly, in the case of a read command, master VFM 40 would cause data to be read from an appropriate location within filesystem 46(4) (/FS3) on disk 34. Then, master VFM 40 would send a storage fulfillment reply back to slave VFM 42(*a*). In the case of a write operation, storage fulfillment reply would indicate success or failure of the operation. In the case of a read operation, storage fulfillment reply would include the data read from the appropriate location of the filesystem 46(4) (/FS3) on disk 34. Then, slave VFM 42(*a*) can forward the storage fulfillment reply back to the host 84.

As another example, in the context of storage command 97 directed at filesystem 46(7) (/FS2) received by slave VFM 42(*b*), slave VFM 42(*b*) determines that filesystem 46(7) (/FS2) is in a local namespace 44-1 but is managed remotely by slave VFM 42(*a*), so it sends storage command 98 to slave VFM 42(*a*) as the manager VFM for fulfillment. Slave VFM 42(*a*) then locally fulfills the storage command 98 with respect to filesystem 46(7) (/FS2) by sending storage command 99 directed at the blocks of storage that underlie filesystem 46(7) (/FS2). For example, in the case of a write command, slave VFM 42(*a*) would cause data of the storage command 98 to be written to an appropriate location within filesystem 46(7) (/FS2) on disk 34. Similarly, in the case of a read command, slave VFM 42(*a*) would cause data to be read from an appropriate location within filesystem 46(7) (/FS2) on disk 34. Then, slave VFM 42(*a*) would send a storage fulfillment reply back to slave VFM 42(*b*). In the case of a write operation, storage fulfillment reply would indicate success or failure of the operation. In the case of a read operation, storage fulfillment reply would include the data read from the appropriate location of the filesystem 46(7) (/FS2) on disk 34. Then, slave VFM 42(*b*) can forward the storage fulfillment reply back to the host 84.

In some embodiments, slave VFM 42(*a*) also performs step 140. In step 140, slave VFM 42(*a*) locally mounts a local filesystem 46(7) (/FS2) stored on persistent storage 32, the local filesystem 46(7) (/FS2) being within the SNS 44, the slave VFM 42(*a*) managing the local filesystem 46(7) (/FS2).

In some embodiments, slave VFM 42(*a*) also performs step 150. In step 150, slave VFM 42(*a*) processes another filesystem storage command 95 directed at the local filesystem 46(7) (/FS2) of the SNS 44-1 received from the remote host 84 over the network interface (e.g., network interface circuitry 56 of the processing node 38 on which the slave VFM 42 is running) by (sub-step 152) sending a data storage command 96 directed at the local filesystem 46(7) (/FS2) to the persistent storage 32 and (sub-step 154) receiving a storage fulfillment reply at the slave VFM 42(*a*) from the persistent storage 32 in response. Then (sub-step 156) slave VFM 42(*a*) can forward the storage fulfillment reply to the host 84 in response.

In some embodiments, slave VFM 42(*a*) also performs step 160. In step 150, slave VFM 42(*a*) processes another filesystem storage command 90, 98 directed at the local filesystem 46(7) (/FS2) of the SNS 44-1 received from an intermediary VFM 62 of the SNS 44-1. The intermediary VFM 62 (e.g., master VFM 40 in the case of command 90, slave VFM 42(*b*) in the case of command 98) had previously received a previous storage command 89, 97 from the host 84. Slave VFM 42(*a*) performs the processing of step 160 by performing sub-steps 162, 164, and 167. In sub-step 162, slave VFM 42(*a*) sends a data storage command 91, 99 directed at the local filesystem 46(7) (/FS2) to the persistent storage 32. Then, in sub-step 164, slave VFM 42(*a*) receives a storage fulfillment reply from the persistent storage 32 in response. Then, in sub-step 166, slave VFM 42(*a*) can forward the storage fulfillment to the intermediary VFM 62 in response.

Thus, techniques for providing a DSS 30 with a plurality of flexible VFMs 62 that are capable of responding to hosts 84 without requiring the hosts 84 to maintain records about which filesystems 46 are managed by which VFMs 62. This is done by arranging the VFMs 62 in a master/slave configuration having one master VFM 40 and several slaves VFMs 42, the master VFM 40 providing configuration information for the slave VFMs 42 and creating an SNS 44 between the VFMs 62. Hosts 84 are then able to access any filesystem 46 within the SNS 44 through any of the VFMs 62, even if the filesystem 46 is managed by a different VFM 62.

This arrangement can provide the additional benefit that different hosts 84 or different applications running on hosts 84 (e.g., under the control of different clients) can be provided with access to different SNSes 44 and be configured to access all VFMs 62 that are part of those respective SNSes 44.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A system comprising:
    persistent storage;
    networking circuitry for connecting to a remote host over a network; and
    one or more processing nodes, each processing node comprising memory coupled to processing circuitry, the one or more processing nodes running a set of virtualized filesystem managers (VFMs) having a shared namespace, the set of VFMs including:
        a master VFM, the master VFM managing a configuration filesystem stored on the persistent storage, the configuration filesystem storing configuration information for the set of VFMs; and
        a slave VFM, the slave VFM remotely mounting the configuration filesystem from the master VFM, the slave VFM obtaining details of its configuration from the remotely-mounted configuration filesystem, the slave VFM sharing the shared namespace with the set of VFMs, the shared namespace including a set of filesystems stored on the persistent storage, each filesystem of the shared namespace being managed by a single VFM of the set of VFMs, and each filesystem of the shared namespace being accessible by the remote host through any of the VFMs of the set of VFMs.
2. The system of claim 1 wherein the master VFM and the slave VFM run on a single processing node of the one or more processing nodes, the master VFM and the slave VFM sharing access to cache of the single processing node.
3. The system of claim 1 wherein the master VFM and the slave VFM run on separate processing nodes of the one or more processing nodes.
4. The system of claim 1 wherein the master VFM manages a first filesystem of the set of filesystems, the first filesystem being locally mounted by the master VFM, the slave VFM remotely mounting the first filesystem from the master VFM.
5. The system of claim 1 wherein the slave VFM manages a first filesystem of the set of filesystems, the first filesystem being locally mounted by the slave VFM, the master VFM remotely mounting the first filesystem from the slave VFM.
6. The system of claim 1 wherein the set of VFMs also includes another slave VFM, the other slave VFM remotely mounting the configuration filesystem from the master VFM, the other slave VFM obtaining details of its configuration from the remotely-mounted configuration filesystem, the other slave VFM sharing the shared namespace with the set of VFMs.
7. The system of claim 6 wherein the master VFM manages a first filesystem of the set of filesystems, the first filesystem being locally mounted by the master VFM, the slave VFM and the other slave VFM both remotely mounting the first filesystem from the master VFM.
8. The system of claim 6 wherein the slave VFM manages a first filesystem of the set of filesystems, the first filesystem being locally mounted by the slave VFM, the master VFM and the other slave VFM both remotely mounting the first filesystem from the slave VFM.
9. The system of claim 1 wherein the one or more processing nodes also run another set of VFMs having another shared namespace, the other set of VFMs including:
    the master VFM; and
    another slave VFM not within the set of VFMs, the other slave VFM remotely mounting the configuration filesystem from the master VFM, the other slave VFM obtaining details of its configuration from the remotely-mounted configuration filesystem, the other slave VFM sharing the other shared namespace with the other set of VFMs, the other shared namespace including another set of filesystems stored on the persistent storage, each filesystem of the other shared namespace being managed by a single VFM of the other set of VFMs, and each filesystem of the other shared namespace being accessible by the remote host through any of the VFMs of the other set of VFMs, the set of filesystems and the other set of filesystems differing in at least one filesystem member.
10. The system of claim 9 wherein the master VFM manages a local filesystem not within the set of filesystems and not within the other set of filesystems, the local filesystem being locally mounted by the master VFM, the local filesystem not being accessible through either of the slave VFM and the other slave VFM.
11. A method performed by a slave virtualized filesystem manager (VFM) running on processing circuitry of a data storage system, the method comprising:
    remotely mounting a configuration filesystem stored on persistent storage of the data storage system from a master VFM running on the processing circuitry of the data storage system, the master VFM managing the remotely-mounted configuration filesystem, the remotely-mounted configuration filesystem storing configuration information for a set of VFMs running on the processing circuitry having a shared namespace, the slave VFM obtaining details of its configuration from the remotely-mounted configuration filesystem;

remotely mounting a remote filesystem stored on persistent storage of the data storage system from a manager VFM of the set of VFMs running on the processing circuitry, the manager VFM managing the remote filesystem, the remote filesystem being within the shared namespace; and processing a first filesystem storage command directed at the remote filesystem received from a remote host over a network interface of the data storage system by sending a second filesystem storage command directed at the remote filesystem of the shared namespace from the slave VFM to the manager VFM and receiving a storage fulfillment reply at the slave VFM from the manager VFM in response.

12. The method of claim 11 wherein the manager VFM is the master VFM.

13. The method of claim 11 wherein the manager VFM is another slave VFM of the set of VFMs running on the processing circuitry.

14. The method of claim 11 wherein the method further comprises locally mounting a local filesystem stored on persistent storage of the data storage system, the local filesystem being within the shared namespace, the slave VFM managing the local filesystem.

15. The method of claim 14 wherein the method further comprises processing a third filesystem storage command directed at the local filesystem of the shared namespace received from the remote host over the network interface of the data storage system by sending a data storage command directed at the local filesystem to the persistent storage of the data storage system and receiving a storage fulfillment reply at the slave VFM from the persistent storage in response.

16. The method of claim 14 wherein the method further comprises processing a third filesystem storage command directed at the local filesystem of the shared namespace received from an intermediary VFM of the set of VFMs, the intermediary VFM having previously received a fourth filesystem storage command directed at the local filesystem of the shared namespace from the remote host over the network interface of the data storage system, wherein processing the third filesystem storage command includes:

sending a data storage command directed at the local filesystem to the persistent storage of the data storage system;

receiving a first storage fulfillment reply at the slave VFM from the persistent storage in response to sending the data storage command to the persistent storage; and sending a second storage fulfillment reply from the slave VFM to the intermediary VFM in response to receiving the first storage fulfillment reply from the persistent storage.

\* \* \* \* \*